United States Patent
Chernykh (10) Patent No.: US 12,515,855 B2
(45) Date of Patent: Jan. 6, 2026

(54) DEVICE FOR ORGANIZING ACCESS TO AT LEAST ONE COMPARTMENT

(71) Applicant: MARTISTEL INNOVATION FZCO, Dubai (AE)

(72) Inventor: Ilya Chernykh, Paralimni (CY)

(73) Assignee: MARTISTEL INNOVATION FZCO, Dubai (AE)

( * ) Notice: Subject to any disclaimer, the term of this patent is extended or adjusted under 35 U.S.C. 154(b) by 125 days.

(21) Appl. No.: 18/038,217

(22) PCT Filed: Sep. 22, 2021

(86) PCT No.: PCT/EP2021/076028
§ 371 (c)(1),
(2) Date: May 23, 2023

(87) PCT Pub. No.: WO2022/111882
PCT Pub. Date: Jun. 2, 2022

(65) Prior Publication Data
US 2024/0002115 A1    Jan. 4, 2024

(30) Foreign Application Priority Data
Nov. 24, 2020   (EP) ..................................... 20209439

(51) Int. Cl.
*B65D 51/18*      (2006.01)
*A47G 29/14*      (2006.01)
(Continued)

(52) U.S. Cl.
CPC ........... *B65D 51/18* (2013.01); *A47G 29/141* (2013.01); *B65D 25/04* (2013.01); *B65D 43/16* (2013.01);
(Continued)

(58) Field of Classification Search
CPC ...... B65D 88/126; B65D 43/26; B65D 43/20; B65D 43/12
(Continued)

(56) References Cited

U.S. PATENT DOCUMENTS 2,943,903 A      7/1960  Peterson et al.
5,167,341 A  *  12/1992  Morton ................ B65D 88/128
                                                        220/345.5
(Continued)

FOREIGN PATENT DOCUMENTS

DE   102009031278 A1    1/2011
DE   102019003946 A1   12/2020
(Continued)

OTHER PUBLICATIONS

The International Search Report (with English translation) and the Written Opinion (with English translation) of the International Searching Authority, or the Declaration for International Application No. PCT/EP2021/076028, Nov. 22, 2021.

*Primary Examiner* — Jeffrey R Allen
(74) *Attorney, Agent, or Firm* — Brett A. Schenck (57) ABSTRACT

A device with a lid and a compartment that has separate storage areas that open upward. The device has a transport device with a slide that is displaceable in a transport direction. The slide extends transversely to the transport direction over the entire width of the compartment and cover part of the storage areas of the compartment. The slide is slidably mounted between the compartment and the lid in the transport direction, and two slide plates are arranged on the slide and overlap with the slide and are slidably mounted relative thereto in the transport direction of the slide. The slide is displaceable in the transport direction by a controllable drive of the transport system and wherein one of the slide plates is fixable in a stationary manner by a holding element of the (Continued)

transport system, whereby the slide can move relative to the slide plate.

16 Claims, 6 Drawing Sheets

(51) Int. Cl.
  *B65D 25/04*    (2006.01)
  *B65D 43/16*    (2006.01)
  *B65D 43/20*    (2006.01)
  *B65D 55/02*    (2006.01)

(52) U.S. Cl.
  CPC ............ *B65D 43/20* (2013.01); *B65D 55/02* (2013.01); *B65D 2251/0021* (2013.01); *B65D 2251/0081* (2013.01); *B65D 2251/1016* (2013.01); *B65D 2543/00194* (2013.01)

(58) Field of Classification Search
  USPC ................ 220/524, 254.9, 255, 345.5, 254.2
  See application file for complete search history.

(56) References Cited

U.S. PATENT DOCUMENTS

| | | | |
|---|---|---|---|
| 6,247,773 B1 | 6/2001 | Harigal et al. | |
| 10,070,935 B2 * | 9/2018 | Waimberk | A61B 50/362 |
| 2016/0022362 A1 * | 1/2016 | Waimberk | A61B 50/362 |
| | | | 220/255 |

FOREIGN PATENT DOCUMENTS

| | | |
|---|---|---|
| EP | 2347680 A1 | 7/2011 |
| EP | 3473142 A1 | 4/2019 |
| WO | 2013176621 A1 | 11/2013 |

* cited by examiner

DEVICE FOR ORGANIZING ACCESS TO AT LEAST ONE COMPARTMENT

The invention relates to a device according to claim 1. The device comprises at least one compartment and, in each compartment, a lockable lid arranged above the compartment, the compartment having dividing elements which form storage areas in the compartment which are separated from one another and open upwards in the direction of the lid. The invention further relates to a method for organizing access to a storage area according to claim 14.

The devices are known from the state of the art that serve for the storage and provision of objects or products of different types and sizes.

U.S. Pat. No. 2,943,903 teaches such a device with a plurality of compartments and storage areas that can be closed by means of two lids and two sliding plates. In the closed state, the lids and the sliding panels, thus the sliding plates, are arranged next to each other in such a way that the lids hinder a sliding movement of the panels. Only when the lids are opened are the panels released for sliding movement and access to all compartments and storage areas is possible, if required.

DE 10 2019 003 946 A1 describes a device with a plurality of compartments and storage areas which can be integrated into a building wall and are accessible on both sides of the building wall via a respective roller shutter. In addition, individual storage areas within the device can be closed by means of a further, smaller roller shutter for better thermal insulation if the corresponding storage area is designed for cooling the objects or products stored therein.

U.S. Pat. No. 6,247,773 B1 describes a cooling device with several compartments and storage areas. The storage areas of the compartments can be closed and opened by means of two cover plates that can be moved manually in relation to each other.

It is a disadvantage of known devices that access to individual storage areas of the device cannot be partially restricted. It is the task of the present invention to propose a device and a method with which this disadvantage of previously known devices and methods can be eliminated.

The task is solved with a device according to claim 1. The task is also solved with a method according to claim 14. Advantageous further developments can be found in the dependent subclaims.

The device according to the invention comprises, in a manner known per se, at least one compartment and a closable lid arranged above the compartment, wherein the compartment has dividing elements/partition elements/dividers which form storage areas in the compartment which are separated from one another and open upwards in the direction of the lid. The device further comprises: a transport system with at least one cover plate which is designed as a slide and is mounted in a free space between the at least one compartment and the at least one lid so as to be displaceable in a transport direction, wherein the slide extends transversely to the transport direction over the entire width of the compartment and covers altogether a part of the storage areas of the compartment.

The device according to the invention differs from the previously known devices in that at least two sliding plates are arranged on the slide and can be overlapped with the slide and are mounted so as to be displaceable relative to the latter in the transport direction of the slide. The slide plate may also be referred to as a sliding plate, in particular a sliding plate on the slide. The transport system comprises at least one controllable drive and at least one controllable holding element, wherein the slide can be displaced in the transport direction by means of the drive and wherein at least one of the slide plates can be fixed in a stationary manner by means of the holding element, whereby a relative movement between the slide and the slide plate can be affected.

The method according to the invention serves to organize access to a storage area in a compartment of the device according to the invention or an advantageous further development thereof. In this case, access to a storage area in the compartment can be affected by a combined positioning of at least one slider and sliding plates in the transport direction of the transport system, in that the at least one slider and the sliding plates are positioned above the openings of the storage areas whose access is to be prevented and do not cover the storage area to which access is to be made possible, and wherein the lid of the device is released for opening as soon as the positioning of the at least one slider and the slider plates located underneath is completed.

It is within the scope of the invention that the device according to the invention or an advantageous further development thereof is designed to carry out the method according to the invention, preferably in an automated manner.

As described above, an essential feature of the device according to the invention is that the sliding plates are arranged on the slide and can be overlapped with it. The sliding plates allow to block a storage area that is not blocked by the slide and vice versa. The arrangement of the slide plates on the slider is space-saving, as no additional guides need to be provided on the housing of the device to support the slide plates in a movable manner.

Furthermore, the space-saving design also favors the arrangement of a drive provided according to the invention. By means of said drive, it is possible to move both the slider and the sliding plates arranged thereon. In particular, no further drive is required for the movement of the sliding plates. This is because, in order to bring about a relative movement between the slider and the sliding plates, the holding elements provided in accordance with the invention can be actuated in order to fix the sliding plates in a stationary manner. It is thus possible in a simple manner and with only one drive to effect both equal and opposite relative movements between the slider and the sliding panels in order to be able to block or release access to the storage areas in a flexible manner.

The design according to the invention also favors an automatable operation of the device according to the invention for the organization of the access to selected storage areas. In particular, it is advantageous that this is possible even when the lid is closed. In addition, it is possible to provide the device for use by different operators, whereby different storage areas can be made accessible or blocked to the operators as required.

The device and the method according to the invention are explained in more detail below, together with their advantageous further embodiments.

DESCRIPTION OF THE OPERATION OF THE DEVICE

Initial State:

The device can be empty. The lids can be closed. The sliders are preferably in a zero position. The sliding plates/movable plates in the sliders are fixed in the centre position.

The compartment, which can also be described as a tray, is provided at the place in the device where it is to be placed (inserted) in the device. There it is inserted into the device. The compartment is preferably open at the top and can be formed with a plurality of spatially separated areas. Each of these areas may have its own opening facing upwards. Partition walls/dividing elements can be provided between the areas.

Sliders and/or sliding plates can be provided to cover at least part of the openings of the compartment/areas. These can form a unit with each other or be provided separately from each other. A combination of coordinated positions of the sliders and the sliding plates can be provided, which can cover different openings of the compartment/areas depending on the position of these elements.

Preferably, by removing/moving an access cover, access can be provided to the cover (slider/slide plates) of the compartment and preferably to the contents of the compartment.

The user gets access to the required section/storage area of the compartment and collects his deposited order there. Access to the section/area can be provided in particular by an arrangement of sliders and/or sliding panels specific to the respective area. The access to the section/area can be provided in particular by a specific displaceability of sliders and/or sliding panels for the respective area. Access to further sections/areas can be prevented.

The access lid to the contents of the compartment is closed.

The sliders with the slide plates are moved either to the initial position or to the next required position to release an access to another section/area.

The compartment can be removed from its position in the device and replaced with a new compartment/tray.

Description of the Sliders with the Sliding Plates

Sliders and sliding plates can be provided at a 90° angle to each other on the compartment, preferably movably. The slider and sliding plate can be mounted so that they can slide against each other, at least on the compartment.

Each slider represents a solid/stable element, which can preferably be a rectangular plate of, preferably small thickness. Element and plate may be used synonymously here. In a top view of the compartment, the compartment may be provided with a length and a width spanning the surface of the compartment. Preferably, this surface comprises the apertures of the compartment described above. In relation to the following description, length and width may be interchangeable and serve primarily to distinguish the orientations and movements of the slide and slide plate(s).

The slider can be horizontally or vertically slidable. The length/width of the element/plate (slider) in its direction of movement can be greater than or equal to half the length of the compartment in the same direction (the direction of movement of the slider) and can also extend beyond the compartment. The length can be the extension in the direction of movement. The width can be the extension transverse to the direction of displacement. The length of the panel in the vertical/vertical direction may be equal to or greater than the length of the compartment. Thus, the slider located above the compartment preferably covers the compartment at least halfway in the direction of movement of the slider.

This is preferably a complete covering of the compartment in this area. The slider covers the compartment e.g. in a vertical direction (transverse to the direction of displacement). On the underside/bottom surface facing the compartment, guide devices/guide channels can be provided by means of which the slider can be movably mounted on the device.

By means of these or further guiding devices/guiding channels, the sliding plates (movable plates) can be movably mounted, preferably on the slider. The movability of the sliding plates can be in the same direction as for the slider itself (e.g. horizontal).

The number of sliders can preferably be at least two (one slider per compartment). The sliders preferably move on a common rail. Each slide preferably has its own (electric) drive and its own gear (it can be a toothed belt drive, a ball screw drive, etc.).

The at least two sliders can then be used together to manage accessibility to the same number of compartments. Each slider can basically have two end positions. The first is when the slider is approximately halfway along its length/width in the direction of movement beyond the edge of the compartment (so that it only covers a vertical row of areas of the compartment). The second end position is when the slider is close to the second slider in the end position.

Preferably, the device comprises an electrical control unit, which is signal-technically connected at least to the drive. Preferably, the control unit is designed by means of a control logic stored therein to control the drive in order to effect a displacement of the at least one slider. In particular, it is conceivable that the displacement of the slider is time-controlled and/or displacement-controlled and/or event-controlled. Preferably, the control unit is configured to receive external control signals and to effect the displacement of the slider in dependence on such an external control signal. A displacement of the slider is easily possible when the lid is closed, as the slider is movably mounted in the free space between the lid and the compartment below.

The slide plates of the sliders represent thin, solid rectangular parts. The sliding plates in the direction of movement of the sliders are slightly smaller than the sliders in the same direction. Preferably, they are adapted in length to the width of the sliders, preferably identical to it. In the horizontal direction, the (slide) plates are arranged in a (separate) channel/holder. The channels/holders are preferably arranged in a row along the slider. There are preferably at least two slide plates in each slider. The slide plates preferably do not have their own drive. In this case, they move with respect to the sliders due to the movement of the sliders themselves by means of at least one stop or by engagement of the slider plates with pins. The pins are preferably placed in the end positions and possibly in the middle position of the device, i.e. outside the attachment points of the compartments (not above the compartments).

The slide pins can extend upwards to the height of the sliding panels. The slide pins can be retracted/sunk downwards, under the panels. Thus, when the pins are lowered, the sliding plates move together with the slider. When the pins are raised, the slide plates are held in position by the pins in the area where they are located. When the sliders move, the movable plates move in relation to the sliders (in fact, in such a case, the sliders move, the plates remain unmoved). Depending on the holding time within which the sliding plates are held by the pins, the plates can move to any distance from 0 to a maximum possible distance in relation to their respective sliders. In a laterally extended position, in which they protrude behind the slider, the sliding plates preferably cover at least one adjacent area/opening.

Preferably, the control unit described above is signal-technically connected to at least one controllable holding element, which comprises, for example, an actuator and at least one aforementioned sliding pin or a comparable component. The actuator causes the sliding pin or the comparable component of the holding element to be advanced. Preferably, the control unit is configured, by means of the stored control logic, to control the actuator in such a way that it causes the sliding pin to be advanced, for example at a desired time or in another suitable manner. Preferably, the control unit is designed to receive external control signals in order to control the actuator and to displace the slider in such a way that the sliding plates are fixed in position or released for movement with the slider, if required.

The slide plates can be secured in their central position (i.e. in the middle of the slide) by means of a spring pin or other holding device in relation to the slide.

The sliding plates of one slide can enter the respective corresponding channel of the second slide which is adjacent in the direction of movement of the sliding plate. In doing so, the movable plates protrude and/or move beyond the border/outer edge of the respective slider. The second slide is in at least one position in the immediate vicinity, i.e. within reach of the slide plates of the first slide. When the sliding plates enter the channel of the neighboring slider, they can be fixed in relation to this slider by means of a spring pin or other holding device and thus also pass over to the other slider or create a fixed connection between the sliders.

Particularly preferably, the individual compartments are covered by individual lids, of which preferably only one can be opened at a time. Underneath, the several preferably two sliders can be arranged and/or underneath the lids can be delivered to the individual compartments.

This allows the sliders to work together to uncover and cover the areas/openings of a compartment, with the slider missing from the further compartment at that time, but the cover of the further compartment blocking access to the further compartment for that long. In this way, the number of sliders for a plurality of compartments can be kept low if they are used together for all compartments and are slidably stored between them.

The number of sliders (1, 2, 3, 4, . . . ) and sliding panels (1, 2, 3, 4 . . . ) can be adapted to their width and the number and/or width of the areas/openings of the compartments.

Preferably, the lids each have at least one lock which can be opened or closed by means of a control signal. Preferably, the control unit described above is signal-connected to the lock of the lid in order to output a corresponding control signal to the lock as soon as the combined positioning of the at least one slider and the sliding plates is completed.

Furthermore, sliding panels may be provided which extend transversely to the device for organizing access to the contents of sections of at least one compartment formed by dividing a compartment by means of dividing elements by area.

The compartment can be placed at the locations of the attachment of compartments (shelves) in the device. These attachment points are arranged in rows within the device at equal distances from the user in such a way that access to the compartment(s) is completely restricted from its (their) near and far sides as well as from the right, left and bottom.

The device preferably consists of a base frame, enclosing structures and lid(s). All elements of the device are attached to the base frame. The enclosing constructions protect the interior of the device. In addition, the enclosing constructions restrict access to the device.

The lids, whose number is equal to the number of compartments, restrict access to the contents of the respective compartment from above.

The device preferably has at least two fixed sliders. The fixed sliders move under the lids of the device above the compartments in a horizontal direction in the abovementioned top view back and forth between the lids (along the transport device).

The sliders move so that their bottoms are in close proximity to the top of the compartment(s) along the entire row of these compartments. The sliders provide partial blockage of access to the contents of the compartments from above.

Preferably, each slider has its own drive. The drive allows independent movement of the slider over and along the tray/compartment in the manner described above.

It is advisable that each slider completely covers the compartment transversely to the direction of transport. The length/width of the slider in the direction of movement is preferably at least as great as half the length of the compartment in the same direction.

Within each slider there are preferably at least two sliding plates (tongues). The slide plates cover a part of the compartment. The slide plates are preferably slightly shorter than the length of the slide in the direction of movement of the slide. The slide plates can extend to the right and left independently of each other in relation to the slider. The extension length of the slide plates is at least half of the slide width.

The movement of the slide plates in relation to the slides preferably takes place either in the end positions or in the middle position of the slides. The movement of the sliding plates preferably takes place by engagement of the plates with sliding pins (holding elements) or by means of stopping of the plates in the groups of sliding pins.

Each of the slider plates preferably has at least one fixable layer within its respective slider.

Each of the slide plates can preferably extend from its respective slide in such a way that it partially enters a second (adjacent) slide (in its receptacle for slide plates).

Each of the sliding plates of a first slider can preferably have at least one position of fixation (securing position) with the neighbouring slider, in which it is connected to the first slider via the sliding plates. The slide plate is preferably arranged in such a way that it is partially retracted into the slide.

A method of organizing access to the contents of the sections of a compartment formed by dividing the compartment by means of dividing elements consists in ensuring access to the contents of both an entire compartment and the contents of any ½, ¼, ⅜, ⁶⁄₇, ⁷⁄₁₆ or ¾ of the compartment(s). Access is thereby achieved by the combination of the mutual position of the rigid slides over the compartments and a partial covering of the compartments.

Preferably, it is envisaged that access to the contents is provided from the smaller sections of the compartments. Such access is achieved by complementing the combination process of the mutual positions of the rigid sliders with different combinations of the positions of the sliding panels above the compartments with a partial covering of the compartments.

Thus, with 2 sliding plates in each slider and with the same division of the compartment into 4 sections along the direction of movement of the sliders, ⅛, ¼ of the compartment will be accessible in the second direction, ⅜, ½ of the compartment will be accessible in the second direction, etc., except for the aforementioned compartment sections. With 4 sliding panels in each slider, ¹⁄₁₆ of the compartment etc. will be accessible.

The basic operation of the present invention is explained by means of an embodiment example according to the attached figures.

Figure 1:
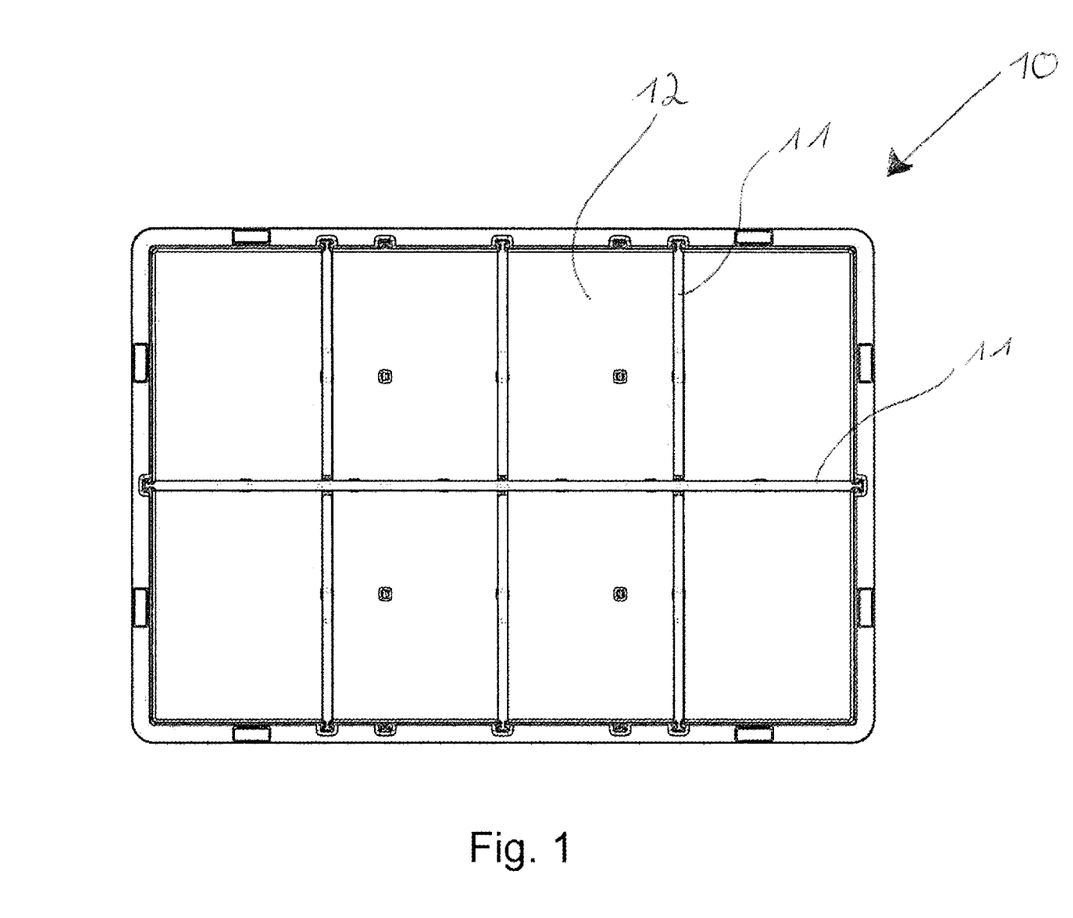
FIG. 1 is a top view of a compartment according to the invention with dividing segments/dividing elements.

FIG. 1 shows a top view of a compartment 10 according to the present invention which is divided into individual areas 12 or sub-compartments by means of dividing elements 11. The device according to the present invention can in particular be designed to allow access to one or more of these areas selectively.

Figure 2:
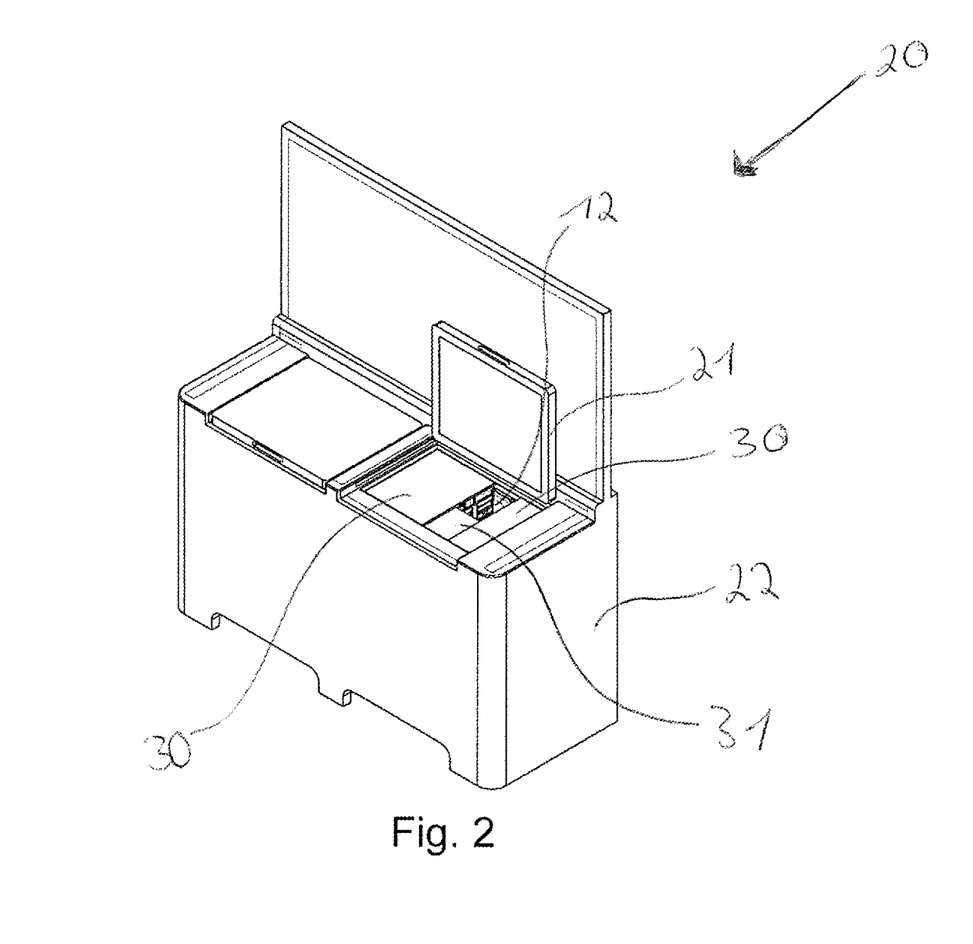
FIG. 2 is a general view of an embodiment of the present invention with 2 receiving areas for 2 compartments with 2 lids.

FIG. 2 shows a perspective view of the device 20 according to the invention in an embodiment with two lids 21 and two compartments 10 of which at least one area 12 is recognizable, whereby at least one slider or slide 30 and preferably two associated slider or slide plates 31 can be provided above the compartment with the open lid. The compartment 10 as well as the slider 30 and the associated slider plates 31 may preferably be provided on the base body 22 of the device 20. In principle, the compartment 10 may be insertable into the receiving area for the compartment 10 in the device 20 from above, when the lid is open, or laterally or from behind. In the depicted state of the embodiment according to FIG. 2, access to an area 12 of the compartment 10 is enabled, whereby the further areas as depicted in FIG. 1 are concealed by at least one slider 30 and its sliding plates 31.

In the embodiment according to FIG. 2, in which two lids 21, two compartments 10 and two slides 30 with associated sliding plates 31 are provided, the two slides 30 can be jointly feedable to the same compartment or the same area below a lid 21 and jointly cover the area of the compartment 10 with open lid 21 to which access is to remain blocked.

Figure 3:
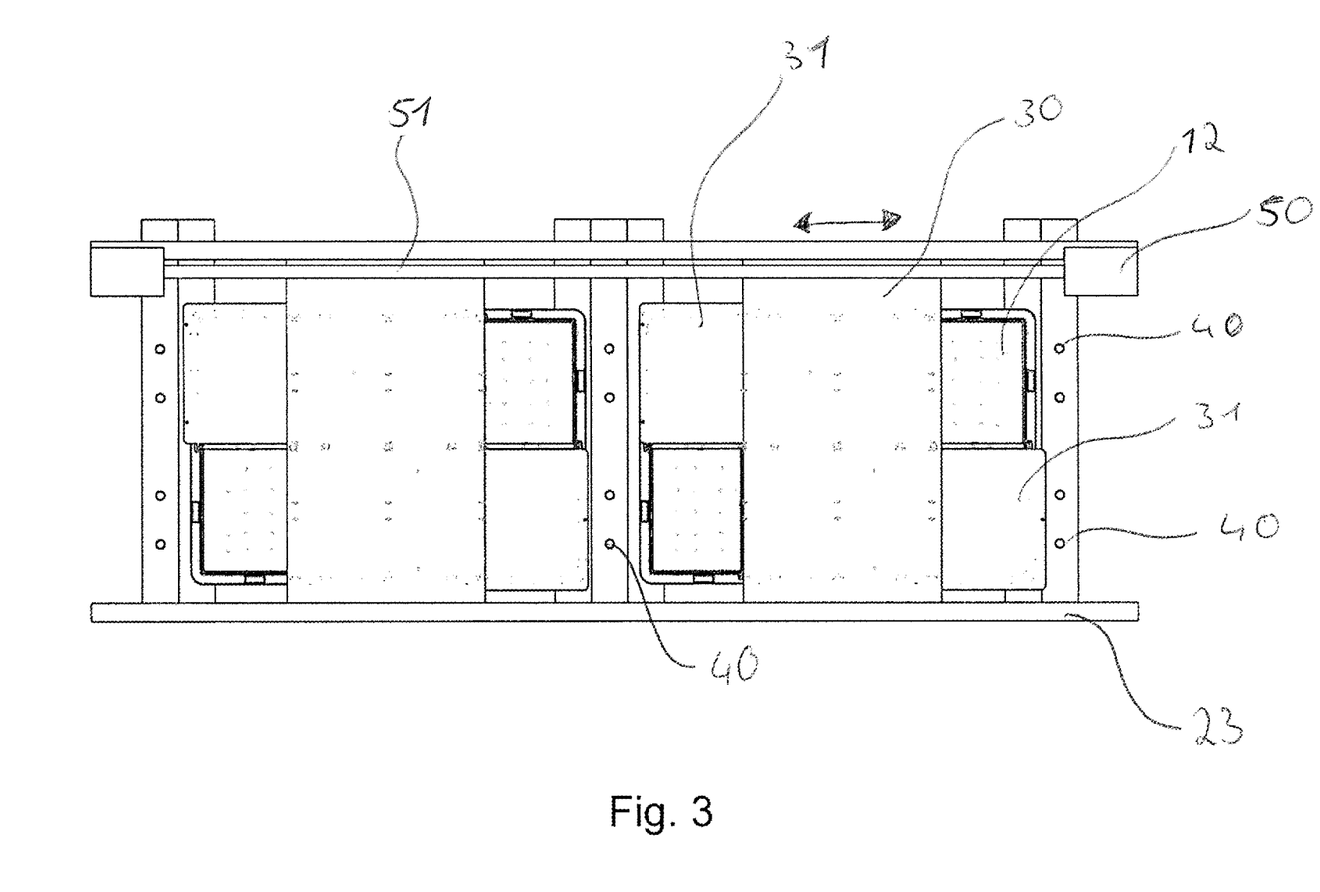
FIG. 3 is a top view of the inner workings of the device according to the invention.

FIG. 3 shows a detailed top view of the mechanism according to the present invention for covering areas 12 of a compartment 10. As can be seen, the slider 30 can be added to the compartment 10 above the openings of the individual areas 12, whereby the slider plates 31 can be provided overlapping with the slider 30. Preferably, the slider plate 31 is in operative connection with the slider 30, particularly preferably on an underside of the slider 30.

The slider can be mounted so that it can be moved horizontally in the plane of observation along the transport device 51 in a transport direction which is shown by an arrow in FIG. 3. A drive 50 can be provided for this purpose, which is in active driving connection with the slider 30.

If more than one compartment 10 is provided, multiple sliders 30 and corresponding slider plates 31 may be provided. Preferably, if there are a plurality of compartments with corresponding openings above them for access to the compartments 10, there are two sliders 30 or one slider 30 for each compartment 10 (and preferably a corresponding number of lids).

The areas 12 of the compartment 10 are arranged in horizontal rows and vertical columns (in a top view of the compartment), as shown for example in FIG. 1. The number of slider plates 31 per slider 30 can be based on the number of horizontal rows of areas 12 in the compartment 10. Particularly preferably, one slide plate 31 is provided for each row of areas 12 of a compartment 10.

The length of the slider plates 31 can be equal to or smaller than the width of the slider 30 in the transport direction of the slider 30. This allows the slider plate 31 to disappear completely behind the slider 30 as required.

The slider 30 preferably extends transversely to a transport direction (vertically in a top view) along the transport device 51 at least over the entire width of the compartment and may also extend beyond it. The slider 30 preferably extends in its transport direction (horizontally in a top view) along the transport device 51 relative to the extent of the compartment 10 to at least half the width of the compartment. Accordingly, the slider 30 may be configured to cover at least half of the areas 12 of the compartment 10.

A retaining device with retaining elements 40 may be provided on both sides of a compartment 10 on the device 20. This is preferably provided on the frame 23 of the device 20.

Figure 4:
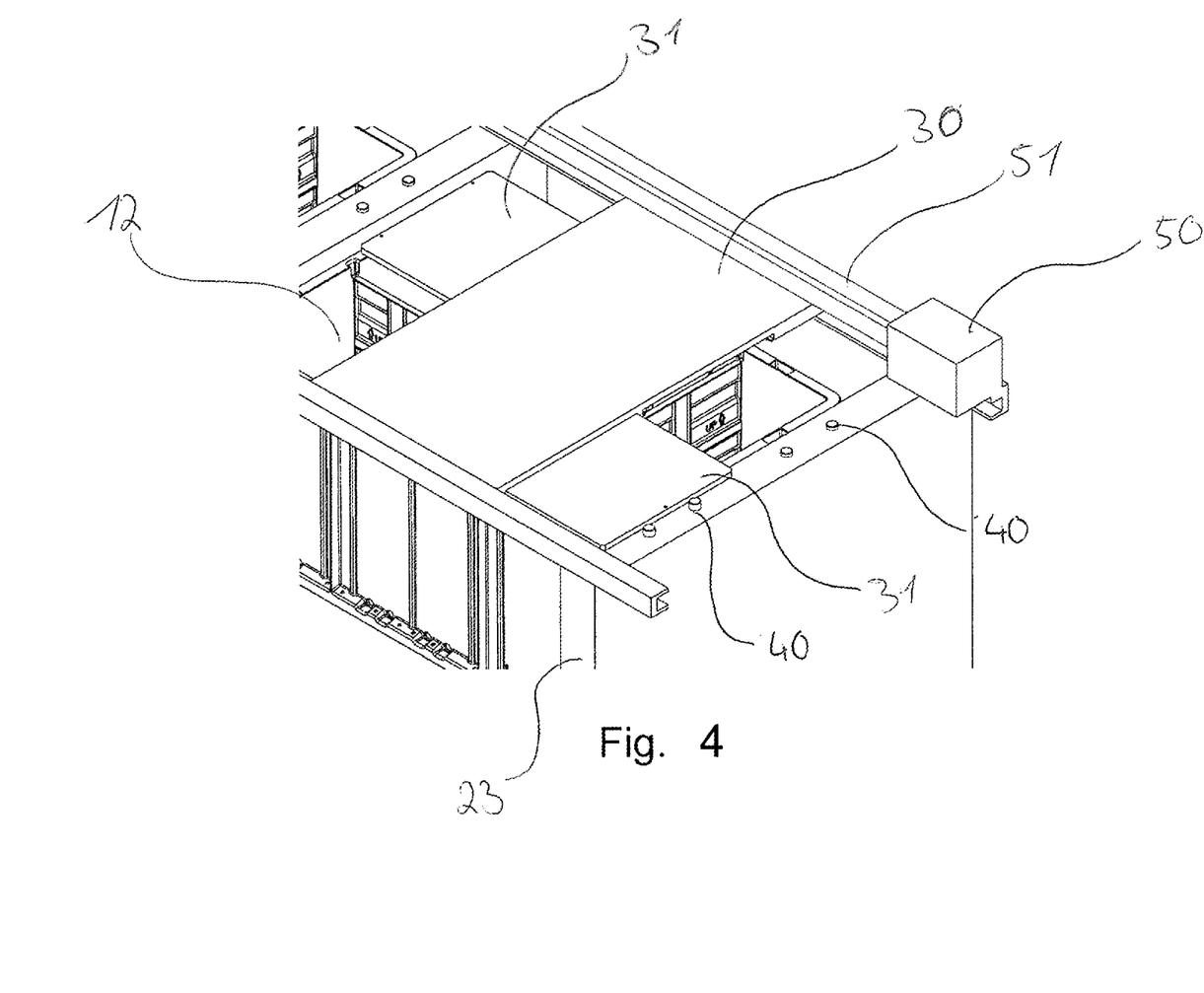
FIG. 4 is a perspective view of section according to FIG. 3 showing the operation of the slider, the slider plates and the retaining elements.

FIG. 4 shows a detailed perspective view of the mechanism according to FIG. 3. The slide plates 31 of the slide 30 are shown extended to two different sides and in this case each cover an area 12 of the compartment 10. On both sides of the compartment in the direction of transport of the slide 30, the retaining elements 40 are each arranged to be extendable.

When the slider 30 is moved and the slider plates 31 are supported by the extended retaining elements 40, the slider plates 31 can be moved in relation to the slider 30. This can be possible for each slide plate 31 basically to both sides of the slide 30. If there are several sliders, they can be moved independently of each other on the transport device by means of individual drives 50.

Figure 5:
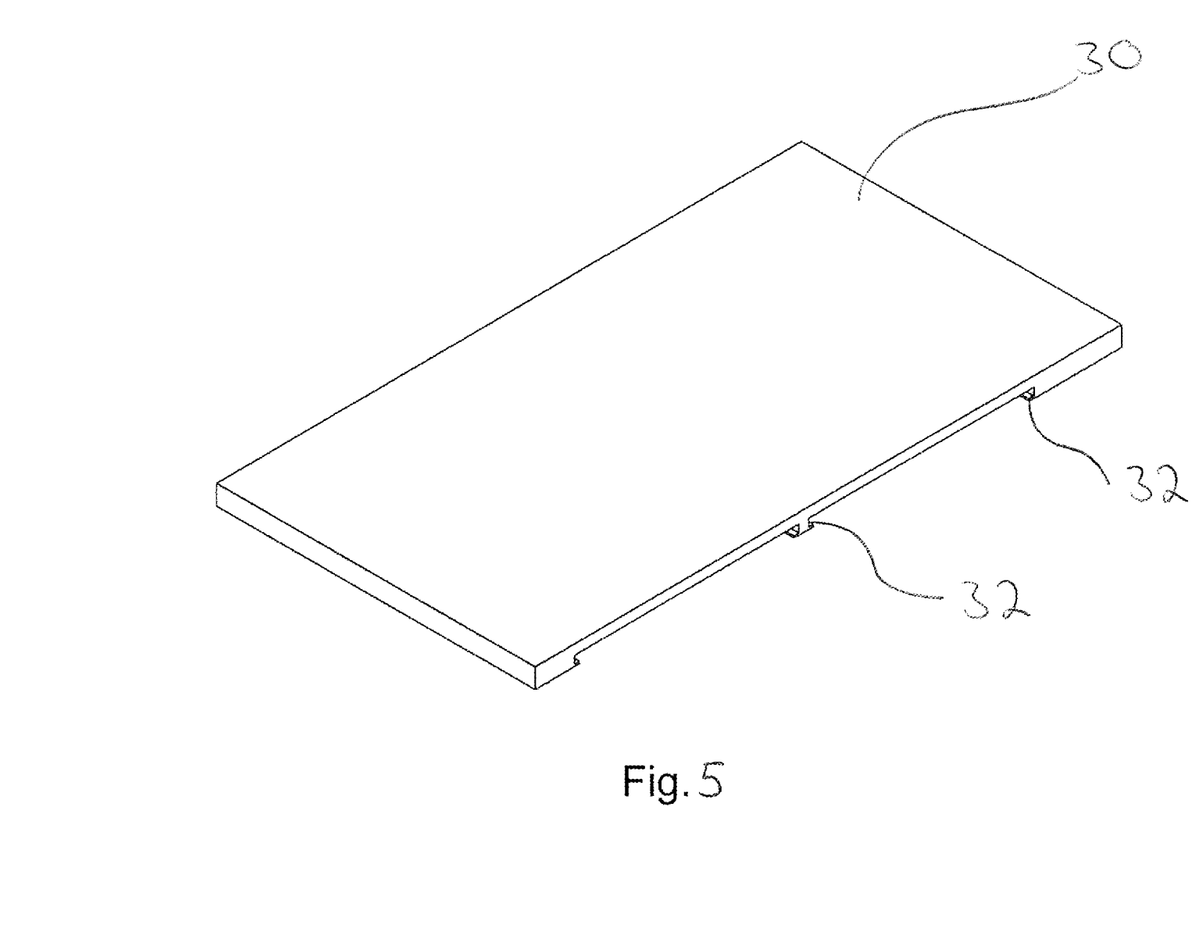
FIG. 5 is a detailed view of a slide according to the invention (top view) and FIG. 6 is a detailed view of a slide according to the invention (view from below with 2 slide plates.

FIG. 5 shows a detailed view of a slide 30 according to the invention, which preferably has guide elements 32 for the slide plates 31 on its underside. These can be designed as receiving grooves for the slide plate 31.

Figure 6:
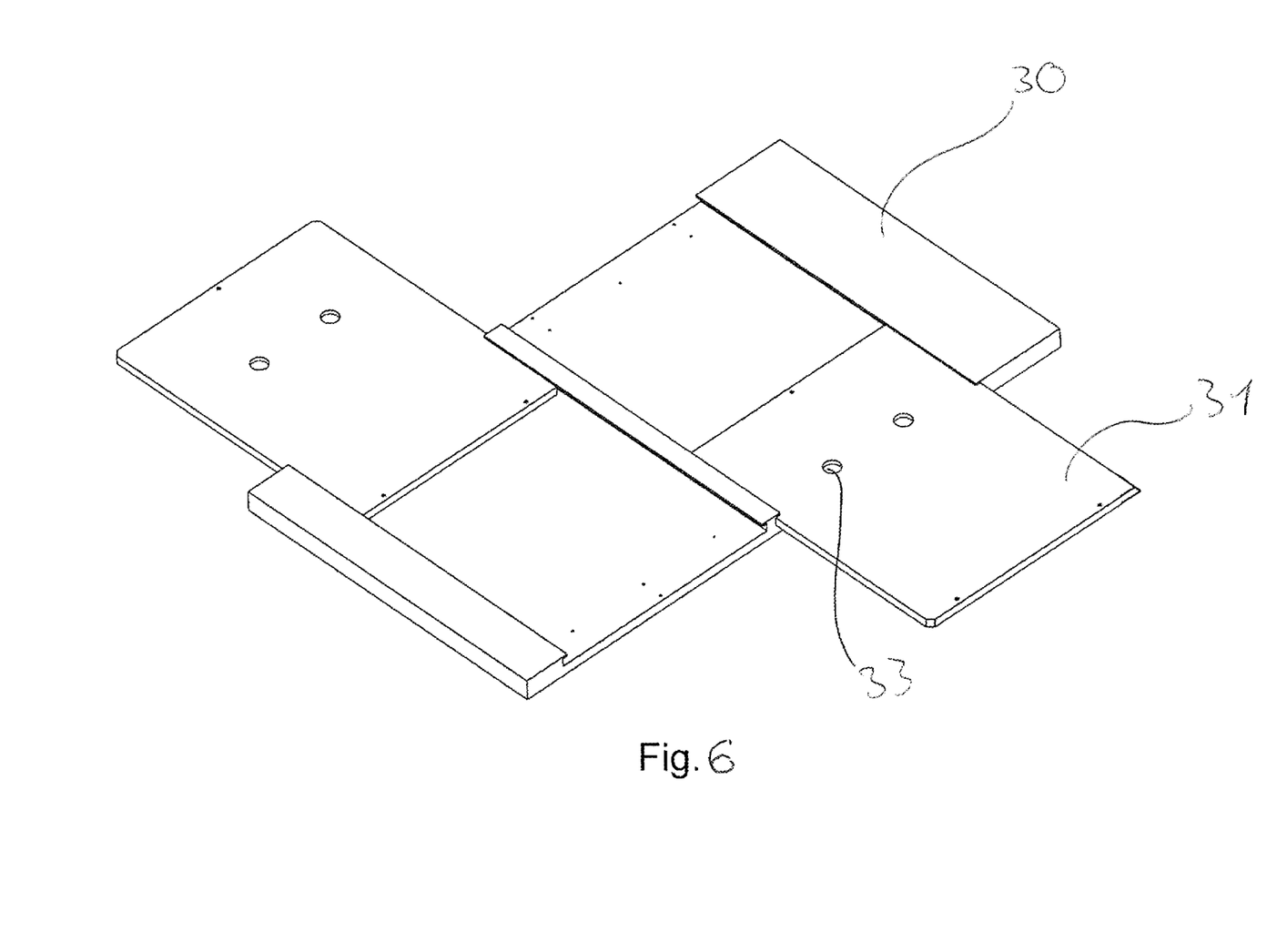

FIG. 6 shows a bottom view of a slide 30 according to the invention, in which the slide plates 31 are arranged in the guide elements 32 as shown in FIG. 5. As can be seen in FIG. 6, the slide plates 31 can be moved to either side of the slide 30 so that they can protrude either to one side or to the other side of the slide 30 below it.

Preferably, indentation or recesses 33 are provided in the slider plates 31 so that the retaining elements 40 on the device 20 according to the invention not only enable the slider plates 31 to be displaced but, in addition, the slider plates can also be fixed in position when the retaining elements 40 engage in the recesses 33. Thus, by means of an interaction of the retaining elements 40 in the sliding plates 31, it is possible to pull in, hold in and push in the sliding plates 31.

The invention claimed is:

1. Device (20) with at least one compartment and a closable lid arranged above the compartment, wherein the compartment has dividing elements which form storage areas in the compartment which are separated from one another and open upwards in the direction of the lid; the device comprising:

a transport device having at least one cover plate which is designed as a slide and is mounted in a free space between the at least one compartment and the at least one lid such that it can be displaced in a transport direction, the slide extending transversely with respect to the transport direction over the entire width of the compartment and covering part of the storage areas of the compartment wherein at least two sliding plates are arranged on the slide and are overlappable with the slide and are mounted so as to be displaceable relative thereto in the transport direction, and wherein the transport device comprises at least one controllable drive and at least one controllable holding element, wherein the slide adapted to be displaced in the transport direction by the drive and at least one of the sliding plates is fixable in a stationary manner by the holding element, as a result of which a relative movement between the slide and the at least one sliding plate is effectable.

2. Device according to claim 1, wherein in the case of several compartments, the at least one cover plate and at least one of the sliding plates can be delivered to each compartment by the transport device.

3. Device according to claim 1, wherein in the case of a plurality of compartments, a continuous free space is formed between the compartments and the covers for the transport device.

4. Device according to claim 1, wherein the length of the slide transverse to the transport direction corresponds at least to the length of the compartment.

5. Device according to claim 1, wherein the width of the slide corresponds at least to the width of a storage area, preferably to half the width of the compartment in the transport direction.

6. Device according to claim 1, wherein the storage areas are organized in rows and columns which are aligned in the transport direction.

7. Device according to claim 1, wherein the number of sliding plates corresponds to a number of rows of storage areas in the compartment.

8. Device according to claim 1, wherein the sliding plates are mounted such that they are displaceable laterally with respect to the slide by at least the width of a depositing region in the transport direction.

9. Device according to claim 1 further comprising at least one retaining element, wherein the retaining element comprises a sliding pin which can be advanced towards the sliding plates and, in the advanced state, holds the sliding plates stationary during a movement of the slide along the transport device, as a result of which the relative movement between the slide and the sliding plate can be affected.

10. Device according to claim 1, wherein the sliding plates are arranged in guide devices on the at least one slide and the guide devices are designed to receive projecting sliding plates of adjacent slides.

11. Device according to claim 9, wherein two adjacent slides are connectable to each other by the holding elements and the sliding plates.

12. Device according to claim 1, wherein the slide and the sliding plate form a functional unit.

13. Device according to claim 1, wherein the sliding plate is arranged in the slide such that it can be displaced by contact.

14. Method for organizing access to a storage area in a compartment by a device according to claim 1, wherein access to a storage area in the compartment is affectable by a combined positioning of at least one slide and sliding plates in the transport direction, in that the at least one slide and the sliding plates are positioned above the openings of the storage areas whose access is to be prevented and do not cover the storage area to which access is to be enabled, and wherein the lid of the device is released for opening as soon as the positioning of the at least one slide and the sliding plates located thereunder is completed.

15. The method according to claim 14, wherein a control unit controls the combined positioning of the slide and the sliding plates and that the control unit releases the lid of the device to open.

16. Device according to claim 10, wherein two adjacent slides are connectable to each other by the holding elements and the sliding plates.

* * * * *